INVENTOR
ROGER C. JONES

BY Hurwitz & Rose

ATTORNEYS

United States Patent Office 3,441,734
Patented Apr. 29, 1969

3,441,734
SOLID STATE INFRARED OSCILLATOR
Roger C. Jones, Tucson, Ariz., assignor to Melpar, Inc., Falls Church, Va., a corporation of Delaware
Filed Dec. 10, 1965, Ser. No. 512,970
Int. Cl. H04b 9/00
U.S. Cl. 250—199
13 Claims

ABSTRACT OF THE DISCLOSURE

A solid state infrared oscillator includes a semiconductor body, and a pair of spaced-apart electrodes thereon. The body contains a region coincident with the gap between the electrodes in which the mean free path of an electron therethrough exceeds the length of that gap. Electrons are injected into the aforementioned region at one side of the gap and are density modulated at the other side of the gap. The density modulated beam of electrons is subjected to reversals of direction to cause drifting thereof back and forth through the aforementioned region. Energy is extracted from the drifting beam via the electrodes.

---

Figure 1:
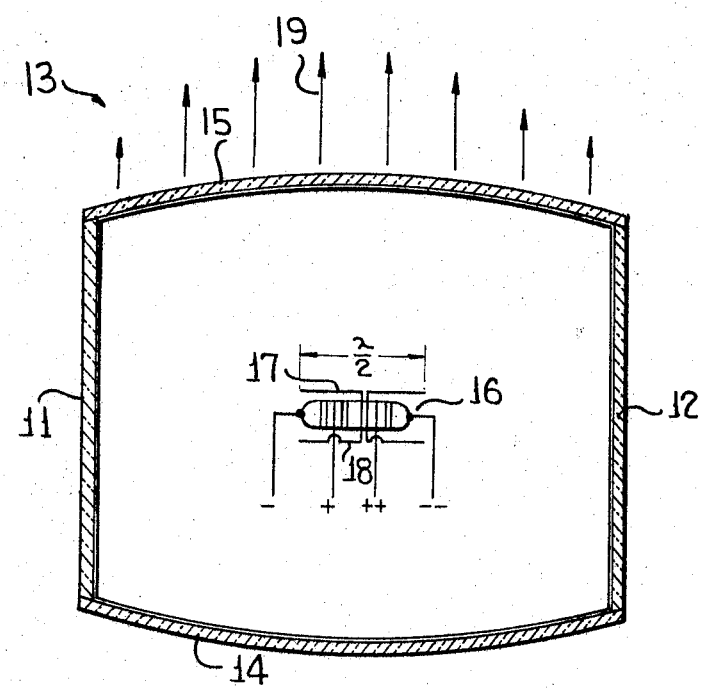

The present invention relates generally to devices for generating coherent power in the infrared region of the spectrum, and more particularly, to sources of coherent radiant energy in the infrared and millimeter wave regions employing solid state and physical optics principles to provide klystron-like generation of power.

In the past numerous attempts have been made, generally without success, to provide sources capable of coherent power generation in the infrared and millimeter wave regions of the spectrum. The advent of the laser and the use of laser techniques of implementation have not as yet overcome problems with respect to the provision of practical devices suitable for power generation in this region, and particularly in the region of from 50 to 1000 microns. At present, it appears unlikely that electron-injection lasers will ever be capable of operation in the 50–1000 micron region, while gaseous lasers are presently restricted to coherent power generation in the region up to approximately 35 microns. Moreover, should subsequent developments in the field of laser technology result in the provision of lasers operational above 35 microns, the principles involved in laser operation restrict outputs to discrete places in the spectrum, so that generation of coherent power in any continuous fashion over the entire region under consideration (i.e. approximately 50 to 1000 microns) is theoretically unattainable. It will further be recognized that such developments will ultimately require investigation and experimentation into the properties and characteristics of a wide variety of compounds and elements, since the generation of power by laser action depends upon the stimulated emission characteristics of the particular materials undergoing the lasing action. In addition, lasers do not admit of simple and direct frequency modulation of output power, a characteristic that is essential in present day transmission of information.

Accordingly, it is a broad object of the present invention to provide sources capable of generating coherent power throughout the infrared spectrum.

It is a further object of the present invention to provide sources of coherent infrared power which may readily and directly be frequency modulated.

Briefly, according to the present invention, there is provided a solid state infrared source which utilizes the phenomenon of "beams in a solid" to achieve the desired coherent generation without resort to laser principles. Operation of the solid state source, hereinafter referred to as the reflectron, is analogous to the vacuum case of the reflex klystron, but, insofar as I am aware, the pertinent solid state and physical optics principles have not heretofore been combined to produce structure and/or operation anticipatory of that of the reflectron. An exemplary embodiment will be set forth in the subsequent detailed description, but it is to be emphasized at this point that a number of implementing techniques may be employed consistent with certain critical factors. For example, the reflectron operation depends critically upon the existence of a collision-free (or very nearly so) beam of electrons in a thin, doped semiconductor array. It will be recognized from a consideration of the pertinent principles of solid state physics, that this requirement depends upon such factors as electron-phonon interactions, electron-impurity interactions, electron-plasmon interactions, electron-defect collisions, and interband transitions, which contribute to the phenomena of an electron "colliding" after a short spatial travel. Specific consideration of mean free path and other critical factors aside for the moment, it is essential that any embodiment of the solid state reflectron be capable of accelerating a beam of electrons, of permitting the drift of the beam of electrons, of reversing the direction of the beam of electrons, of neutralizing the space charge of the beam of electrons, and of coupling the beam to a high Q resonator. Briefly, a preferred embodiment of the reflectron may include a heavily doped N-type semiconducting (N+) region to inject electrons through a P-N junction; a lightly doped P-type semiconducting region to form with the N+ region a P-N junction to allow initial acceleration; a first accelerator band; a heavily doped P region (P+) to form a P-N junction with the previously mentioned P region for final electron acceleration and to form a gap-drift region for the basic reflection action; a plated dipole with collector ring tabs for coupling to the cavity and for collection of electron "settling" current, respectively; a final accelerator band; a final insulator region forming a junction with the heavily doped P+ region; outside electrodes for (—) and (— —) connectors; and an orthogonal Fabry-Perot resonator or other enclosed or semi-enclosed high Q resonator structure about the solid state portion.

The present invention includes the following novel features: the utilization of collision-free beams in solids; coupling of a density modulated electron beam to an infrared resonator; obtaining klystron action at extremely high frequencies without the use of delicate procedures such as sending large currents through a small cylinder in a vacuum; obtaining klystron action at frequencies which have heretofore been unattainable with other devices; the use of a doped lattice structure to neutralize space charge of the beam; obtaining klystron action with high efficiency and output power at extremely high frequencies with extremely low operating voltages; the appropriate use of P-N junctions and biasing fields to allow the generation and use of an electron beam in a dense solid.

The advantages of the reflectron are, among other things, that it can generate coherent infrared power in regions of the spectrum where lasers have thus far been unable to operate; it is tunable and hence covers gaps in the spectrum where laser action is impossible; it is much smaller than a gaseous laser and, unlike the laser is not restricted to generation of coherent power at discrete portions of the spectrum; it can readily and directly be frequency modulated; its coherence is equaled only by that of a gaseous laser, and is highly superior to that of solid state lasers; and its noise figure is much lower than that of any solid state device in which collisions are permitted, or in vacuum klystrons where hot cathodes and partition noise result in high noise figures.

Figure 2:
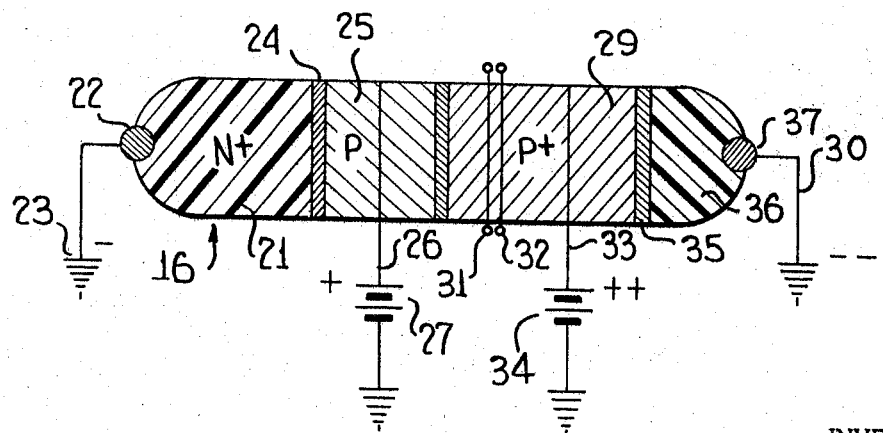

The above and still further objects, features and attendant advantages of the present invention will become apparent from a consideration of the following detailed description of one specific embodiment thereof especially when taken in conjunction with the accompanying drawing in which:

FIGURE 1 is a sectional view, partially schematic, of one suitable embodiment of the reflectron; and FIGURE 2 is a sectional view of the solid state portion of the reflectron of FIGURE 1.

Referring now to FIGURE 1, the reflectron includes an orthogonal Fabry-Perot resonator in the form of a high Q resonant optical chamber or cavity 13 enclosing or partially enclosing the solid state portion 16. Cavity 13 may include side mirrors of the Fabry-Perot type arranged in a mutually orthogonal configuration, including mirrors 11 and 12 having a reflectance of approximately 99% and a 1% loss factor. Such mirrors are well known in the optical art and need not be further elaborated upon here. It is sufficient to note that mirrors 11 and 12 are separated by a distance which will depend upon the desired resonant frequency of the reflectron, and that, in general, the overall dimensions of the cavity are determined by resonant frequency. Slightly curved Fabry-Perot mirrors 14 and 15 close the chamber 13, mirror 14 being provided with properties similar to those of mirrors 11 and 12 while mirror 15 is provided with a reflectance of from 94 to 97% and a 1% loss characteristic, such that the latter mirror is partially transparent. Thus a fraction of from 2 to 5% of the cavity power may be radiated through mirror 15 to the exterior environment, the radiated power thereafter being handled by conventional infrared optical techniques.

Purely as an example, the mirrors 11 and 12 may be separated by a distance of approximately two centimeters, the same for mirrors 14 and 15; while the latter mirrors may have a radius of curvature on the order of five centimeters. Solid state portion 16, located substantially centrally of chamber 13 and maintained at its location by any suitable insulative support (not shown), is so disposed with respect to the curved mirrors 14 and 15 that a substantial portion of the energy radiated by half wavelength plated dipole radiators 17 and 18 is directed toward the curved mirrors. Since solid state portion 16 has a length considerably greater than a half wavelength of the resonant frequency of the chamber dipole radiators 17 and 18 may be plated on portion 16 without introducing excessive capacitive loading. Dipoles 17 and 18 may, for example, be provided by depositing a suitable metal film on insulative coating on the exterior surfaces of the solid state portion disposed opposite mirrors 14, 15. The radiated infrared power emerging from the resonant cavity is designated by parallel arrows 19.

The temporal coherence of the radiated infrared is on the order of that of a gaseous laser but, as previously noted, is not restricted to discrete wavelengths, nor to the present laser upper limit of about 35 microns. The output power of the reflectron ranges upward to approximately one milliwatt, a useful power output considering that lasers operating in the shorter wavelength regions of interest typically have power outputs of less than one milliwatt. It should also be noted that masers used in low noise amplifier applications amplify signal levels close to that of thermal noise. Since thermal noise power at 300° K. in a signal of 10 megacycles per second bandwidth is about $5 \times 10^{-14}$ watts, microwatt output levels are also quite adequate.

Preferably, solid state portion 16 is cooled, for reasons which will subsequently become apparent, to a temperature of approximately 4.2° K. by immersion of chamber 13 in a liquid helium environment.

Referring now to FIGURE 2, solid state portion 16 comprises a body including a semi-conductor array and an insulator region and having end electrodes 22 and 37 for connection to appropriate sources of biasing potential (here, ground). At the end of the body adjacent electrode 22, which is simply a metallic contact, is a semiconductor region 21 ($n^+$) heavily doped with n-type impurities. Region 21 may, for example, comprise a silicon or germanium crystal doped with arsenic to approximately $10^{18}$ carriers per cubic centimeter.

Adjacent semiconductor region 21 is another semiconductor region 25 (p) lightly doped with p-type impurities so that a P-N junction (and more specifically, an $n^+$-p junction) 24 is formed between regions 21 and 25. An accelerator band 26 is plated on semiconductor region 25 by the disposition of a film of metal in a plane parallel to junction 24, the band subsequently connected to the positive terminal of a low voltage (for example, 3 volt) battery 27. Region 25 may comprise a pure crystal of the same type as initially utilized in region 21, but lightly doped with from $10^{16}$ to $10^{17}$ carriers per cubic centimeter of any appropriate p-type impurity, such as boron or aluminum.

A second P-N junction (i.e., p-$p^+$) 28 is formed by providing a semiconductor region 29 adjacent p region 25, region 29 being heavily doped with p-type impurities to the same extent as region 21.

Ring tabs 31 and 32 are provided by depositing metallic bands about the surface of region 29 and are preferably separated by a distance less than $\frac{1}{16}$ of the longest wavelength of the cavity power to be radiated. Excessive separation of ring tabs 31 and 32 is to be avoided in order that proper velocity modulation of the electron beam be achieved, as will presently be explained.

A final accelerator band 33 is provided in $p^+$ region 29 by deposition of a metal band about a substantially planar portion of the surface of the region. Biasing of accelerator band 33 at a positive potential greater than that of accelerator band 26 may be accomplished by connecting band 33 to a battery 34, of say 6 volt potential. Hence, potential differences of three volts exist across both junctions 24 and 28 with electrode 22 connected to a reference (ground) terminal. Ring tabs 31 and 32 are electrically connected to dipole radiators 17, 18 (FIGURE 1) deposited on insulative coatings on the surfaces of solid state portion 16 disposed opposite mirrors 14 and 15.

The end of solid state portion 16 adjacent electrode 37 preferably comprises an insulator region 36 of any suitable material, such as silicon monoxide. Thereby, a $p^+$-insulator junction 35 is formed between regions 29 and 36. Electrode 37 may be connected to a reference terminal at ground potential.

Each of the semiconductor regions and the insulator region may be of sub-millimeter longitudinal dimension while the diameter of solid state portion 16 may be from one-half to two-thirds of its total length. All sources of biasing potential will, of course, be located externally of cavity 13, with leads extending therefrom into the cavity and appropriately connected to the respective electrodes. The production of microminiature devices of dimensions exemplified above is well within the present state of the art.

In operation, electrons are injected from $n^+$ region 21 into p region 25, with initial electron acceleration occurring primarily through the $n^+$-p junction 24. Further acceleration takes place through p-$p^+$ junction 28, each of these junctions being biased by the respective accelerator band 26, 33. The beam of electrons thus formed essentially drifts through $p^+$ region 29, a gap-drift region being provided in the region of the gap between ring tabs 31 and 32. The drifting of the electron beam is critical to the basic operation of the reflectron and is dependent upon the provision of a sufficiently long mean free path in the semiconductor crystal comprising the body of the device.

Factors contributing to the electron collisions after short spatial travel (mean free path) are as previously mentioned, electron-phonon interactions, electron-defect collisions, electron-plasmon interactions, interband transitions, and electron-impurity interactions. Electron-phonon interactions are effectively quenched by cooling the reflection to sufficiently low temperature (say, 4.2° K.), thereby preventing the independent existence of quantized lattice vibrations (phonons). As previously stated, such cooling may be effected by immersing the reflectron in a liquid helium environment during operation.

Since it is virtually impossible to make a perfect crystal, the absolute concept of Bloch (Floquet) waves breaks down—strict periodicity being destroyed by the presence of defects, with the accompanying electron-defect collisions. This, however, is not a serious factor in the reflectron operation since the *mean* free path of the electrons is sufficiently long.

For a sufficiently fast moving electron, plasmons are excited in pure dielectrics; that is, for such excitation the valence electrons are essentially "free," and energy losses occur. As in the case of electron-defect collisions, however, electron-plasmon interactions are relatively unimportant in overall reflectron action.

Interband transitions are serious above a few electron-volts energy, and require a low voltage system, such as is utilized in the embodiment under consideration, to avoid exorbitant losses and consequent short mean free path. This is characteristic of even a pure, undoped crystal.

The most serious obstacle to the provision of a sufficiently long mean free path lies in electron-impurity interactions, which must necessarily exist because of the semiconductor doping. Even at electron energies as low as 5 electron volts, which are present with the utilization of a low-voltage system (needed to overcome the interband transitions), the electrons collide rather frequently with the donors or acceptors required to produce the desired semiconductor characteristics. The problem is not that impurities are present, however, but that the impurities are distributed randomly within the crystal as a result of the typical doping process. This is true, moreover, even in the presence of some general doping profile. I have found that the solution to this predicament is in the provision of periodic doping of the crystal in one dimension, viz, longitudinally of solid state portion 16, with random distribution of impurities still permissible in the remaining two directions. Periodic doping (and in this case, p-type doping) in a plane is within the present state of the art, and is accomplished by epitaxial growth of crystals. Moreover, the density of doping in one other direction can be held constant by use of such a process, although this is unnecessary in the present embodiment. By virtue of the one dimensional periodic doping, the mean free path of electrons traversing the semiconductor is extremely long, much longer than the dimensions of the semiconductor portion. In such a situation the electrons are not mobility controlled, i.e., the velocity of each electron is not $$\vec{v} = u\vec{E}$$

but rather is $$\vec{v} = \hat{e}_\mathrm{E}\left(\frac{2eV_\mathrm{B}}{m^*}\right)^{1/2}$$

where $\hat{e}_\mathrm{E}$ is a unit vector in the electric field direction, $V_\mathrm{B}$ is the beam voltage, and $m^*$ the effective electron mass.

Thus, the mean free path length required to permit electron beam drift through p+ region 29 is provided primarily by periodic doping of the semiconductor crystal making up the region; by restricting electron energies to low values (say less than or equal to approximately 5 electron-volts) through use of a low voltage system; and by cooling the solid state structure to sufficiently low temperature (say, 4.2° K). The electron beam drift is analogous to that which occurs in the drift space of a conventional klystron; the drift space makeup differing in the two cases, of course, the latter being a vacuum environment while the reflection drift region is solid state.

On their first excursion through the gap between ring tabs 31 and 32 the electrons in the drifting beam are velocity modulated, initially rather weakly, by the weak thermal blackbody radiation in high Q resonant cavity 13 coupled to the ring tabs via the plated dipole. Strong deceleration of the velocity modulated electron beam takes place at the p+- insulator junction 35 and in insulator 36, reducing the velocity of the beam to zero as the electrons are reflected back toward the gap. The electrons are accelerated, by accelerator band 33, and proceed to pass through the ring tab gap in the opposite direction, density modulation of the beam having been produced during the transit of the electrons through the reflecting region. Again, this may be analogized to reflex klystron action wherein electron bunching occurs during travel through the reflecting space. Unlike the klystron, however, the reflection is space charge neutralized by the doping of the semiconductor regions.

As the density modulated beam recrosses the gap there is a resulting excitation of the dipole, and thence of the resonator; that is, energy is transferred from the electrons in the density modulated beam to the resonant cavity 13 via the dipole. After several such traversals, a sufficiently high beam current and high resonator Q is effective to allow the buildup of steady state infrared oscillations, and a fraction (from two to five percent) of the cavity power is radiated through partially transparent Fabry-Perot mirror 15 to the external environment. The radiated power may thereafter be handled by conventional infrared optical techniques. Temporal coherence is on the order of that of a gaseous laser, with output power ranging upward to approximately one milliwatt. As previously stated, the output power of lasers operating in the shorter wavelength regions of the spectrum is typically less than one milliwatt, while low-noise master amplifiers often operate at less than microwatt output levels.

The wavelength of the radiated infrared will depend upon the geometry of the resonant cavity and upon the klystronlike action of the reflectron. Hence, operation anywhere in the infrared spectrum may be achieved by conventional resonant cavity design and tuning techniques and by appropriate adjustment of the biasing voltages.

Frequency modulation is best accomplished by appropriately varying the tuning of resonant cavity 13, a multitude of well known prior art techniques being available for this purpose. In addition, as in the reflex klystron, slight frequency modulation may be obtained by varying one or more of the biasing voltages.

While I have described and illustrated one specific embodiment of my invention, it will be apparent that variations in the specific details of construction set forth herein may be resorted to without departing from the spirit and scope of the invention as defined in the appended claims.

I claim:

1. A source of coherent infrared energy, comprising a solid state body portion and a resonant cavity, said solid state body portion including means for forming a beam of charge carriers, means for accelerating said beam of charge carriers through a preselected region of said body portion, means for producing a drift of said beam of charge carriers through a preselected region of said body portion, means for reversing the direction or drift of said beam of charge carriers, and means for coupling energy from the drifting beam of charge carriers to said resonant cavity for generation of said coherent infrared energy.

2. The combination according to claim 1 wherein said means for forming a beam of charge carriers includes a semi-conductor junction bounded by a pair of extrinsic semiconductor regions of opposite polarity types relative to one another; said means for accelerating including means for forward biasing said semiconductor junction; paid drift producing means including a further semiconductor region adjacent the region through which the acceleration of said beam is produced and forming with the last-named region a further semiconductor junction of opposing polarities, said further semiconductor region having a periodic impurity doping pattern in the dimension in which said beam travels, to provide a sufficiently long mean free path for said charge carriers for said drift to occur, and means for forward biasing the last-named junction; said means for reversing direction of drift including means adjacent said further semiconductor region for producing a retarding electric field for said charge carriers; and said coupling means including an energy radiator element having a pair of collecting electrodes in said further semiconductor region, said electrodes being separated by a distance not exceeding $\lambda/16$, where $\lambda$ is the longest wavelength of the infrared power to be generated.

3. A solid state klystron for generating coherent power in the sub-millimeter region of the frequency spectrum, comprising a semiconductor junction; means for injecting electrons through said junction; means for biasing said junction to accelerate electron flow through the semiconductor region bounding the side of said junction opposite said injecting means; an electron dirft region including a further semiconductor region forming a further semiconductor junction with the first-named region; means for biasing said further junction to enhance electron flow thereacross and into said drift region; a high Q cavity resonator; means for density modulating the flow of electrons in said drift region; and energy radiator means including a plurality of resonator electrodes spaced apart from one another along said drift region for coupling energy between said cavity resonator and the electrons flowing in said drift region.

4. The combination according to claim 3 wherein said further semiconductor region includes impurities arranged in a periodic doping pattern in the general direction of drift of said electrons.

5. The combination according to claim 3 wherein said means for biasing are arranged and adapted to restrict electron energies in said klystron to values not exceeding approximately five electron-volts.

6. The combination according to claim 3 wherein is further included means for cooling the semiconductor regions of said klystron to approximately 4.20 Kelvin.

7. The combination according to claim 3 including means for frequency modulating the energy radiated by said klystron.

8. The combination according to claim 3 wherein said resonator electrodes are spaced by a distance not exceeding $\lambda/16$ where $\lambda$ is the longest wavelength of the spectrum region over which the klystron is to operate.

9. A solid state oscillator for generating frequencies of wavelengths in the millimeter portion of the electromagnetic spectrum, comprising
a pair of semiconductor regions forming a P-N junction, one of said regions containing an excess of charge carriers for injection thereof into said junction, the other of said regions having a polarity relative to said charge carriers for initial acceleration thereof across said junction,
means for further accelerating said charge carriers through said other of said regions,
a further semiconductor region forming with said other of said regions a further P-N junction in the path of said charge carriers, said further region having a polarity relative to said charge carriers for accelerating said charge carriers across said further P-N junction; said further semiconductor region containing a pattern of impurities therethrough for providing a mean free path for said charge carriers in excess of the dimension of said further semiconductor region in the general direction of travel of said charge carriers, whereby to provide a gap-drift region for said charge carriers,
means at least partly in said gap-drift region for extracting energy from the charge carriers drifting thereacross and for radiating the extracted energy,
means for further accelerating said charge carirers through said gap-drift region, and
means coupled to said further semiconductor region for density modulating and for reflecting said charge carriers back through said gap-drift region, whereby to produce multiple excursions of a density modulated beam of charge carriers back and forth through said gap-drift region to enhance said extraction of energy.

10. The invention according to claim 9 wherein is further included a resonant cavity encompassing said semiconductor regions and cooperating with said energy extracting means for passing at least a portion of the extracted energy of said wavelengths to the environment external to said cavity.

11. The invention according to claim 10 wherein is included means for frequency modulating the energy passed to said external environment by said cavity.

12. The invention according to claim 10 wherein said semiconductor regions are cooled to further increase the mean free path of said charge carriers through said further semiconductor region.

13. A solid state infrared oscillator, comprising
a semiconductor body having a longitudinal axis,
a pair of electrodes spaced apart along the longitudinal axis of said semiconductor body,
said semiconductor body containing at least a region coincident with the gap between said electrodes in which the mean free path of an electron therethrough exceeds the length of said gap along said axis,
means for injecting electrons into said region,
means for forming a density modulated beam of said injected electrons,
means for controlling the drift of said density modulated beam of electrons back and forth through said region along a path generally parallel to said longitudinal axis, and
means coupled to said electrodes for extracting energy from the drifting electron beam to provide infrared oscillations.

References Cited

UNITED STATES PATENTS

| | | | |
|---|---|---|---|
| 3,270,241 | 8/1966 | Vural | 315—3 |
| 3,325,748 | 6/1967 | Crabbe | 331—107 |
| 3,105,906 | 10/1963 | Schultz | 250—199 |
| 3,248,669 | 4/1966 | Dumke | 331—94.5 |
| 3,249,891 | 5/1966 | Rutz | 325—105 |
| 3,273,030 | 9/1966 | Balk. | |
| 3,305,685 | 2/1967 | Shyh Wang | 250—199 |
| 3,340,479 | 9/1967 | Ashkin. | |

OTHER REFERENCES

Cecil B. Ellis, Navigation, "Optical Masers in Space Navigation," 1961, vol. 8, No. 3, pp. 206–213.

ROBERT L. GRIFFIN, *Primary Examiner.*

ALBERT J. MAYER, *Assistant Examiner.*

U.S. Cl. X.R.

315—3, 5.18; 331—6, 107; 332—7